United States Patent [19]

Masuda et al.

[11] 3,718,882

[45] Feb. 27, 1973

[54] MAGNETIC SWITCHING APPARATUS

[75] Inventors: Noboru Masuda, Kawaguchi; Tunekazu Kobayashi, Kawasaki, both of Japan

[73] Assignee: Denki Onkyo Co. Ltd., Tokyo, Japan

[22] Filed: Oct. 23, 1970

[21] Appl. No.: 83,302

[30] Foreign Application Priority Data

Oct. 25, 1969 Japan ....................44/101034

Oct. 25, 1969 Japan ....................44/101035

[52] U.S. Cl. ....................338/32 H, 323/94 H

[51] Int. Cl. ....................H01c 7/16

[58] Field of Search...338/32, 32 H; 335/2, 205, 207; 310/DIG. 3; 303/99 H

[56] References Cited

UNITED STATES PATENTS

| | | | |
|---|---|---|---|
| 3,226,631 | 12/1965 | Kuhrt et al. | 338/32 H X |
| 3,676,828 | 7/1972 | Masuda et al. | 338/32 H |
| 3,041,416 | 6/1962 | Kuhrt | 338/32 H |
| 3,459,911 | 8/1969 | Fischer | 335/205 X |
| 3,195,043 | 7/1965 | Burig et al. | 338/32 H |

FOREIGN PATENTS OR APPLICATIONS

| | | | |
|---|---|---|---|
| 1,665,618 | 9/1969 | Germany | 338/32 |

OTHER PUBLICATIONS

IBM Tech. Disclosure Bulletin, "Keyboard Switching Mechanism," Strnad, Vol. 13, No. 4, 9/70.

*Primary Examiner*—D. F. Duggan

*Attorney*—James E. Armstrong and Ronald S. Cornell

[57] ABSTRACT

A switching apparatus comprised of a base containing two magnets, the same poles of which are coupled, a magnetic frame which is extended across both ends of the two magnets to form an endless magnetic loop in conjunction with the base, a galvano-magnetro effect device which is positioned on the coupled portion of the magnetic poles of the base so that the magnetic flux of the two magnets is concentrated on the galvano-magnetro effect device when the galvano-magnetro effect device is magnetically short-circuited at the middle portion of the frame.

11 Claims, 3 Drawing Figures

MAGNETIC SWITCHING APPARATUS

BACKGROUND OF THE INVENTION

The present invention relates to a switching apparatus using a galvano-magnetro effect device such as, for example, a Hall effect device and a magneto-resistance device.

Conventional switching apparatus of this type have been designed so that the magnetic path is formed with a U-shaped magnetic base and a moving yoke, the moving end of which being forced to contact a free end of the base while being supported at the other free end of the base. The density of magnetic flux applied to the galvano-magnetro effect device, which is positioned in the gap between the moving end of the moving yoke and the free end of the base opposite to the moving yoke, is varied by changing the gap distance by turning the moving yoke. Accordingly, conventional switching apparatus are deficient because it is difficult to greatly vary the density of magnetic flux applied to the galvano-magnetro effect device.

The present invention provides a switching apparatus which eliminates this deficiency.

SUMMARY

The present invention provides a switching apparatus comprised of an endless magnetic loop including a base which contains two magnets, the same pole ends of which are positioned opposite each other; at least one galvano-magnetro effect device, such as, for example, a Hall effect device and a magneto-resistance device, arranged on the coupled portion of the base of the magnetic loop; a short-circuiting means which can magnetically short the galvano-magnetro effect device to any portion of the magnetic loop except the base when switching is required; and an external input power supply and load circuit which are connected to the galvano-magnetro effect device.

BRIEF DESCRIPTION OF THE DRAWINGS

The present invention is illustrated in detail in the accompanying drawings whereof.

DETAILED DESCRIPTION

Figure 1:
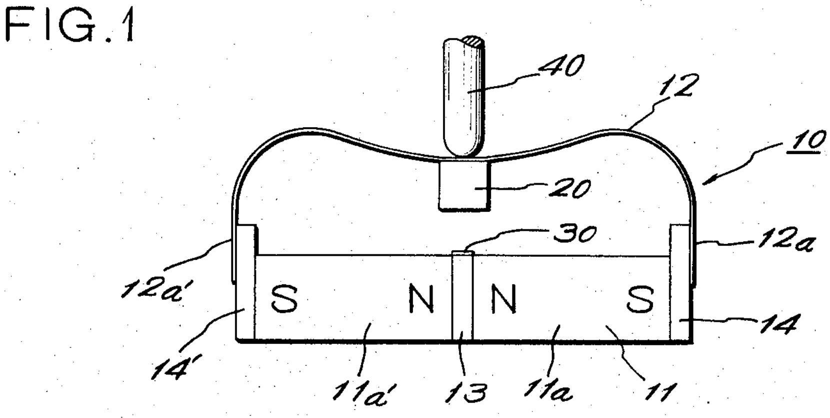
FIGS. 1, 2 and 3 are front views of the switching apparatus of embodiments of the present invention.

Referring to FIG. 1, there is shown a switching apparatus comprised of a magnetic loop 10 which is composed of a base 11 consisting of two magnets 11*a* and 11*a'* and spring plate 12, a magnetic short-circuiting portion 20 which is provided at the center of spring plate 12 toward base 11 as the short-circuiting means, and a galvano-magnetro effect device 30 which is provided on the coupled portion of said base 11 so as to be positioned opposite to said short-circuiting portion 20.

Base 11 consists of two magnets 11*a* and 11*a'* which are arranged so that the both N pole ends of these magnets are coupled with magnetic joint piece 13. Support yokes 14 and 14' are provided in parallel at both S pole ends of base 11 and project from the base and both ends 12*a* and 12*a'* of spring plate 12, which is biased separately from base 11. Ends 12*a* and 12*a'* are attached to yokes 14 and 14', respectively.

Spring plate 12 is made so that its central portion can be bent toward joint piece 13 at the coupled portion of base 11. Plate 12 is provided with short-circuiting portion 20 which contacts or closely approaches joint piece 13 by bending of the spring plate.

Galvano-magnetro effect device 30 is provided on said joint piece 13 so as to be positioned opposite to short-circuiting portion 20 of the spring plate. This galvano-magnetro effect device 30 is connected to an external load circuit (not shown), which functions upon variation of the output voltage or current of said device, and to an external power source (not shown) which supplies the input current to the galvano-magnetro effect device.

Spring plate 12 is provided with an actuating means such as, for example, projection 40 of a push-button cap which can push down the central portion of spring plate 12.

When spring plate 12 is not pressed or is biased at the home position, short-circuiting portion 20 is separated from joint piece 13 of base 11; accordingly, the magnetic flux applied to galvano-magnetro effect device is extremely small.

When projection 40 is pushed down, spring plate 12 is bent and short-circuiting portion 20 is lowered toward joint portion 13, greatly reducing the reluctance across short-circuiting portion 20 and galvano-magnetro effect device 30. When short-circuiting portion 20 is forced to closely approach or contact galvano-magnetro effect device 30, a closed magnetic path including short-circuiting portion 20 as a common magnetic path is formed between both magnetic pole ends of a pair of magnets 11*a* and 11*a'* of base 11. Thus, the magnetic flux of two magnets 11*a* and 11*a'* is concentrated onto said galvano-magnetro effect device 30, actuating said device.

When spring plate 12 is released, it returns to the home position due to its own tension and short-circuiting portion 20 is separated from galvano-magnetro effect device 30.

It is desirable to cover galvano-magnetro effect device 30 with a magnetic material when said short-circuiting portion 20 is forced to contact the device.

The switch apparatus according to the present invention has the following advantages.

Since the magnetic flux from two magnets 11*a* and 11*a'* can be concentrated onto galvano-magnetro effect device 30, the load circuit can be exactly actuated by greatly changing the output of galvano-magnetro effect device 30.

Since the distance between galvano-magnetro effect device 30 and short-circuiting portion 20 can be great, the density of magnetic flux to be applied to galvano-magnetro effect device 30 can be greatly varied.

A contactless switching apparatus can be easily made because galvano-magnetro effect device 30 can be actuated by making short-circuiting portion 20 approach the galvano-magnetro effect device.

Because short-circuiting portion 20 does not rub galvano-magnetro effect device 30 or the protective material covering the galvano-magnetro effect device even when short-circuiting portion 20 is designed to contact galvano-magnetro effect device 30, these contacting portions wear extremely little. Incomplete contact is not caused because short-circuiting portion 20 is attracted to base 11 even though the contacting portion wears slightly.

Figure 2:
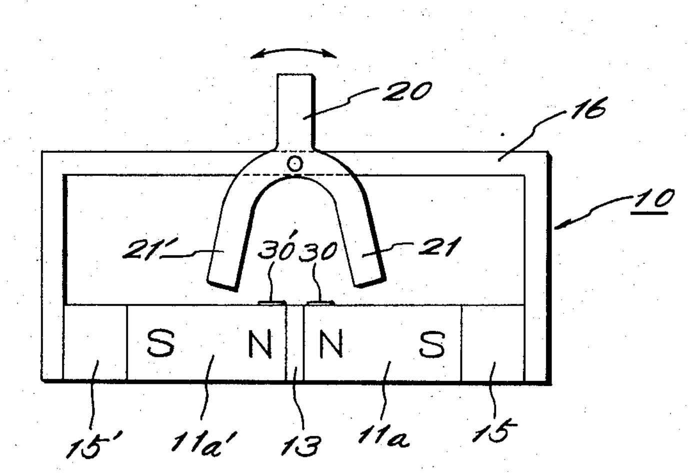

FIG. 2 illustrates a switching apparatus comprised of base 11 consisting of magnets 11*a* and 11*a*' which are protected by magnetic blocks 15 and 15' arranged at both ends of base 11, a magnetic loop 10 which is made by fixing both ends of U-shaped magnetic support frame 16 at magnetic blocks 15 and 15', two galvano-magnetro effect devices 30 and 30' which are independently provided on the coupled magnetic N pole ends of two magnets 11*a* and 11*a*' of said base 11, and a forked moving yoke 20 as the short-circuiting means, which is rotatably attached at the center of said support frame 16.

Moving yoke 20 has two arms 21 and 21' which are extending toward base 11 and which are devised to alternately and selectively approach or contact one of the galvano-magnetro effect devices 30 and 30' according to movement of moving yoke 20 in the direction of the arrow.

In this embodiment, joint piece 13 of base 10 is generally made of a magnetic material; however, it may be made of a nonmagnetic material.

Also in this embodiment, if one of arms 21 and 21' of the moving yoke os forced to contact one of galvano-magnetro effect devices 30 and 30' by turning moving yoke 20, a closed circuit is formed between one of coupled N pole ends of magnets 11*a* and 11*a*' and both S pole ends of the base and a large density of magnetic flux is concentrated onto the galvano-magnetro effect device.

In this embodiment, the switching apparatus is advantageous because two galvano-magnetro effect devices can be alternately actuated and a snap-action type switching apparatus can be made without providing a separate locking means because arms 21 and 21' of moving yoke 20 are alternately attached to base 11.

Figure 3:
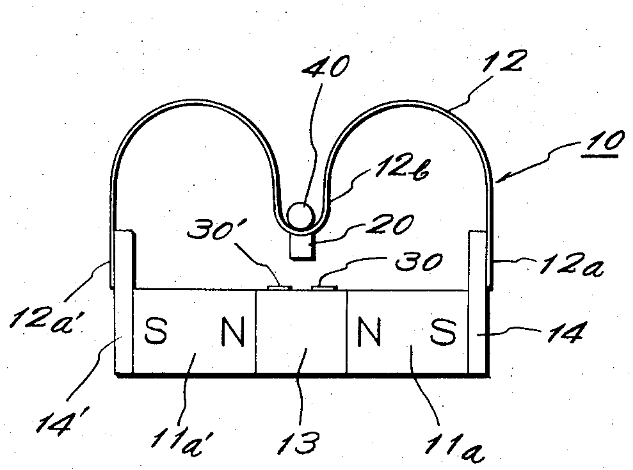

FIG. 3 illustrates a switching apparatus comprised of a plurality of galvano-magnetro effect devices 30 and 30' which are arranged on both magnetic pole ends coupled by joint piece 13 made of magnetic material, spring plate 12 which is provided with flexible portion 12*b* at the center so that said flexible portion can selectively approach the galvano-magnetro effect device and one short-circuiting portion 20 which is provided at the center of spring plate 12.

The switching apparatus is advantageous because short-circuiting portion 20 can be forced to approach or contact one of the galvano-magnetro effect devices 30 and 30' by deflecting flexible portion 12*b* with projection 40; therefore, the number of galvano-magnetro effect devices can be more than three.

What is claimed is:

1. A switching apparatus comprised of
   a. an endless magnetic loop including the base which contains two magnets, the same pole ends of which are coupled;
   b. at least one galvano-magnetro effect device positioned at the coupled portion of said base; and
   c. a short-circuiting portion capable of magnetically shorting the galvano-magnetro effect device to any portion of the magnetic loop except the base.

2. A switching apparatus according to claim 1, wherein a joint piece made of magnetic material is provided between the magnetic poles of the two magnets which form the coupled portion of the base.

3. A switching apparatus according to claim 1, wherein a part of magnetic loop positioned opposite to the base is made of a spring plate which is biased so that it is separated from the base, said spring plate being provided with a magnetic short-circuiting portion located at a position opposite the coupled portion of the base and said short-circuiting portion being forced to approach or contact the galvano-magnetro effect device upon bending of the spring plate.

4. A switching apparatus according to claim 1, wherein a plurality of galvano-magnetro effect devices are provided at the coupled portion of the base to magnetically short the galvano-magnetro effect devices selectively to the magnetic loop by means of the short-circuiting portion.

5. A switching apparatus according to claim 4, wherein two galvano-magnetro effect devices are provided at the coupled portion of the base, a moving yoke with forked arms is rotatably attached at the magnetic loop and said forked arms are forced to alternately and selectively approach or contact the galvano-magnetro effect devices in accordance with movement of the moving yoke.

6. A switching apparatus according to claim 4, wherein the part of the magnetic loop positioned opposite to the base is made of a spring plate, a portion of the spring plate having a flexible portion positioned opposite the coupled portion of the base and being forced to selectively contact or approach one of a plurality of galvano-magnetro effect devices by bending the flexible portion when the spring plate is bent.

7. A switching apparatus comprising
   a. a base member including a pair of magnets, the same pole ends of which are coupled by juxtaposition;
   b. at least one galvano-magnetro effect device positioned at the juxtaposed pole ends of said magnets; and
   c. a magnetic means magnetically coupling the pole ends of said pair of magnets opposite said same pole ends, said magnetic means having at least one movable portion adapted to selectively and alternately at least approach and retreat from said galvano-magnetro effect device thereby varying the magnetic flux acting upon said galvano-magnetro effect device.

8. A switching apparatus according to claim 7 wherein said movable portion of said magnetic means is adapted to approach but not contact said galvano-magnetro effect device.

9. A switching apparatus according to claim 7 wherein said galvano-magnetro effect device is coated with a magnetic material and said movable portion of said magnetic means is adapted to contact the coating of magnetic material.

10. A switching apparatus according to claim 7 wherein said same pole ends of said pair of magnets abut opposite faces of a joint piece.

11. A switching apparatus according to claim 10 wherein said joint piece is composed of magnetic material.

* * * * *